(12) United States Patent
Rubin

(10) Patent No.: US 11,113,588 B2
(45) Date of Patent: Sep. 7, 2021

(54) RANDOMIZATION-BASED HIERARCHICAL AND ASSOCIATIVELY ASSISTED VECTOR LEARNING FOR MACHINE VISION

(71) Applicant: United States of America as represented by the Secretary of the Navy, San Diego, CA (US)

(72) Inventor: Stuart Harvey Rubin, San Diego, CA (US)

(73) Assignee: United States of America as represented by the Secretry of the Navy, Washington, DC (US)

( * ) Notice: Subject to any disclaimer, the term of this patent is extended or adjusted under 35 U.S.C. 154(b) by 190 days.

(21) Appl. No.: 16/590,832

(22) Filed: Oct. 2, 2019

(65) Prior Publication Data

US 2021/0103782 A1 Apr. 8, 2021

(51) Int. Cl.
  *G06K 9/68* (2006.01)
  *G06K 9/62* (2006.01)
  *G06N 20/00* (2019.01)
  *G06K 9/32* (2006.01)

(52) U.S. Cl.
  CPC ............. *G06K 9/6807* (2013.01); *G06K 9/32* (2013.01); *G06K 9/6201* (2013.01); *G06K 9/6255* (2013.01); *G06K 9/6256* (2013.01); *G06N 20/00* (2019.01)

(58) Field of Classification Search
  CPC ...... G06K 9/6807; G06K 9/32; G06K 9/6201; G06K 9/6255; G06K 9/6256; G06N 20/00
  See application file for complete search history.

(56) References Cited

U.S. PATENT DOCUMENTS

| | | |
|---|---|---|
| 7,047,226 B2 | 5/2006 | Rubin |
| 7,783,082 B2 | 8/2010 | Koshizen et al. |
| 7,958,063 B2 | 6/2011 | Long et al. |
| 8,155,949 B1 | 4/2012 | Rubin |
| 8,315,958 B1 | 11/2012 | Rubin et al. |
| 8,422,797 B2 | 4/2013 | Heisele et al. |
| 8,447,720 B1 | 5/2013 | Rubin |

(Continued)

OTHER PUBLICATIONS

Prentzas et al,. "Categorizing Approaches Combining Rule-Based and Case-Based Reasoning," Expert Systems 24 (2), pp. 97-122, May 2007.

(Continued)

*Primary Examiner* — Fayyaz Alam
(74) *Attorney, Agent, or Firm* — Naval Information Warfare Center, Pacific; Kyle Eppele

(57) ABSTRACT

An object in a digital image is automatically recognized by obtaining the digital image, generating a first vector representation of a plurality of pixels of the obtained digital image, randomizing the first vector representation to generate a first generalized vector representation of the digital image that is substantially an order of magnitude smaller than the first vector representation, and searching a repository of hierarchically generalized vector representations of previously recognized digital images, to determine whether the first generalized vector representation of the digital image matches one or more of the previously recognized digital images, within a predetermined threshold value, based on determining a focus area within the obtained digital image, using associative memory.

20 Claims, 6 Drawing Sheets

(56) References Cited

U.S. PATENT DOCUMENTS

| | | | |
|---|---|---|---|
| 8,761,476 | B2 | 6/2014 | Burlina et al. |
| 8,780,195 | B1 | 7/2014 | Rubin |
| 8,923,655 | B1 | 12/2014 | Weston et al. |
| 9,042,606 | B2 | 5/2015 | Bebis et al. |
| 9,208,536 | B2 | 12/2015 | Macciola et al. |
| 9,299,025 | B1 | 3/2016 | Rubin |
| 9,330,358 | B1 | 5/2016 | Rubin |
| 9,396,441 | B1 | 7/2016 | Rubin |
| 9,436,912 | B1 | 9/2016 | Rubin |
| 9,449,280 | B2 | 9/2016 | Rubin |
| 10,131,052 | B1 | 11/2018 | Ibarz Gabardos |
| 10,242,130 | B2 | 3/2019 | Samuel et al. |
| 10,275,906 | B2 | 4/2019 | Tung et al. |
| 10,346,395 | B2 | 7/2019 | Rubin |
| 2012/0155751 | A1* | 6/2012 | Aoba ............ G06K 9/00214 382/159 |
| 2019/0171438 | A1 | 6/2019 | Franchitti |
| 2020/0026949 | A1* | 1/2020 | Alcock ............ G06K 9/3233 |
| 2020/0045354 | A1* | 2/2020 | Gao ............ G06K 9/46 |
| 2020/0335095 | A1* | 10/2020 | Yuan ............ G10L 15/1815 |

OTHER PUBLICATIONS

Chaitin, G.J., "Randomness and Mathematical Proof," Scientific American, 232 (5), pp. 47-52, 1975.

Rubin, S.H., et al., "KASER: Knowledge Amplification by Structured Expert Randomization," IEEE Transactions on Systems, Man, and Cybernetics, vol. 34, No. 6 (Dec. 2004), pp. 2317-2329.

Rubin, S.H., "On Randomization and Discovery," J. Information Sciences vol. 177, No. 1, pp. 170-191, 2007.

Hosseini, H. et al., "Deep Neural Networks Do Not Recognize Negative Images," work was supported by ONR grantsN00014-14-1-0029 and N00014-16-1-2710, ARO grant W911NF-16-1-0485, and NSF grant CNS-1446866, (2017), pp. 1-3.

Lin et al., "Complexity Results on Learning by Neural Nets," Machine Learning 6(3) (Jan. 1995), 21 pages.

Milanova, M. et al., "Compression and Filtration of US Medical images with Modified Inverse Difference Pyramid," Annals of the New York Academy of Sciences (Jan. 2003), pp. 139-151.

Chen, S.C. et al., "A Dynamic User Concept Pattern Learning Framework for Content-Based Image Retrieval," IEEE Transactions on Systems, Man, and Cybernetics—Part C: Applications and Reviews, vol. 36, No. 6 (Nov. 2006), pp. 772-783.

Kountchev, R. et al., "Non-Linear Image Representation Based on IDP with NN," WSEAS Transactions on Signal Processing, Issue 9, vol. 5 (Sep. 2009), pp. 315-325.

Kountchev, R. et al., "Invariant Object Representation Based on Inverse Pyramidal Decomposition and Modified Mellin-Fourier Transform," Information Reuse and Integration in Academia and Industry, (2013), 7 pages.

Rubin, S.H. et al., "On Heuristic Randomization and Reuse as an Enabler of Domain Transference," 2015 IEEE International Conference on Information Reuse and Integration (2015), pp. 411-418.

Chen et al., "A Human-Centered Multiple Instance Learning Framework for Semantic Video Retrieval," IEEE Transactions on Systems, Man, and Cybernetics, Part C (Applications and Reviews) vol. 39 , Issue 2 (Mar. 2009 ) pp. 228-233.

Emery, C., "Photonic neuron may compute a billion times faster than brain circuits," News at Princeton, Apr. 20, 2016.

Lecun, Y., "What's Wrong with Deep Learning?", Conference an Computer Vision and Pattern Recognition (Jun. 10, 2015), 157 pages.

\* cited by examiner

RANDOMIZATION-BASED HIERARCHICAL AND ASSOCIATIVELY ASSISTED VECTOR LEARNING FOR MACHINE VISION

FEDERALLY-SPONSORED RESEARCH AND DEVELOPMENT

The United States Government has ownership rights in this invention. Licensing inquiries may be directed to Office of Research and Technical Applications, Naval Information Warfare Center, Pacific, Code 72120, San Diego, Calif., 92152; telephone (619)553-5118; email: ssc_pac_t2@navy.mil. Reference Navy Case No. 104,242.

BACKGROUND

Artificial neural networks (ANN) represent a family of statistical learning models, which derive from biological neural networks. An ANN may be represented by an interconnected group of nodes, which is similar in structure and function to the neurons in a brain. ANNs may communicate among layers and attempt to minimize statistical error through training. The connections have numeric weights that may be adapted to minimize classification errors. ANNs are well suited to applications that are difficult, if not impossible, to realize using rule-based systems—including machine vision and automated speech understanding. However, it has been proven that hidden-layer neural networks are NP-hard in their learning performance, which may substantially limit their scalability.

Conventional methodologies for machine vision may not tractably learn and may not have capabilities to retain and index all images needed for the machine vision. Further, conventional systems may not be cyber-secure and self-restoring in the event of a cyber-attack. Additionally, neural networks may not be able to recognize analogical patterns. Neural nets (e.g., deep learning) may need to adjust all of their weights every time a new memory is presented. Neural networks are not preferentially trained, which may be disadvantageous in the generality of their learning and replay.

With regard to representations, techniques for Knowledge Amplification with Structured Expert Randomization (KASER) are discussed in U.S. Pat. No. 7,047,226, to Rubin, S. H., which issued May 16, 2006, hereby incorporated by reference herein in its entirety ("'226 patent" hereinafter). As discussed therein, randomization theory holds that the human should supply novel knowledge exactly once (i.e., random input) and the machine extend that knowledge by way of capitalizing on domain symmetries (i.e., expert compilation). In the limit, novel knowledge may be furnished only by chance itself. The term "randomization" generally as used herein, is further discussed in Chaitin, G. J., "Randomness and Mathematical Proof," Scientific American, 232 (5), pp. 47-52, 1975 ("Chaitin" hereinafter), and in Rubin, S. H., "On Randomization and Discovery," J. Information Sciences, Vol. 177, No. 1, pp. 170-191, 2007 ("Rubin 2007" hereinafter).

SUMMARY

Disclosed herein is a method and system for automatically recognizing an object in a digital image. The method may be described as comprising the following steps. One step provides for generating a first vector representation of a plurality of pixels of the obtained digital image. Another step provides for randomizing the first vector representation to generate a first generalized vector representation of the digital image that is substantially an order of magnitude smaller than the first vector representation. Another step provides for searching a repository of hierarchically generalized vector representations of previously-recognized digital images, to determine whether the first generalized vector representation of the digital image matches one or more of the previously recognized digital images, within a predetermined threshold value, based on determining a focus area within the obtained digital image, using associative memory.

This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DETAILED DESCRIPTION

Figure 1:
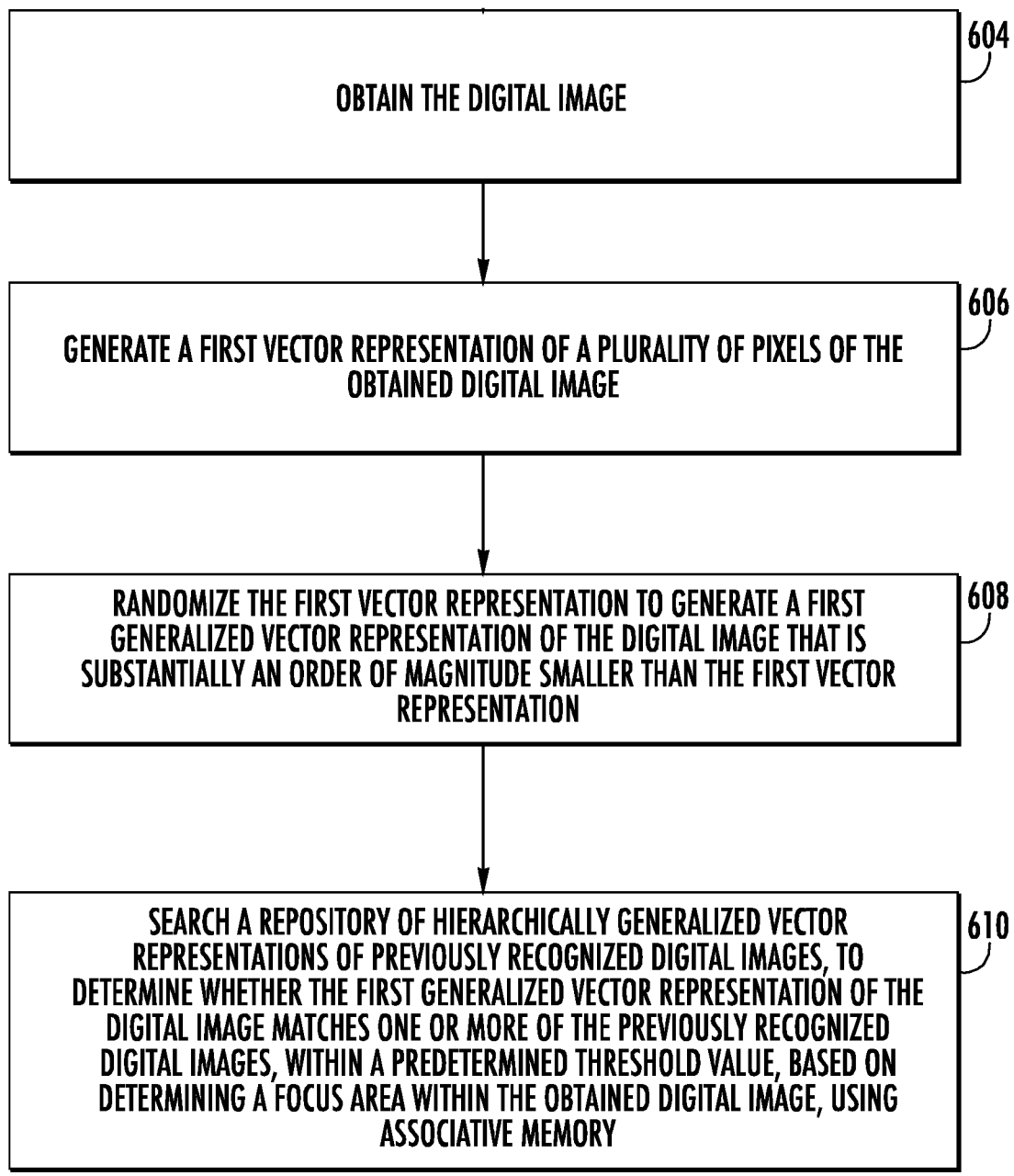
FIG. 1 is a flowchart of an embodiment of a method for automatically recognizing an object in a digital image

FIG. 1 is a flowchart of an embodiment of a method 600 for automatically recognizing an object in a digital image. The first step 604 provides for obtaining the digital image. The next step 606 provides for generating a first vector representation of a plurality of pixels of the obtained digital image. The next step 608 provides for randomizing the first vector representation to generate a first generalized vector representation of the digital image that is substantially an order of magnitude smaller than the first vector representation. The next step 610 provides for searching a repository of hierarchically generalized vector representations of previously recognized digital images to determine whether the first generalized vector representation of the digital image matches one or more of the previously recognized digital images. Step 610 is performed within a predetermined threshold value, which is based on determining a focus area within the obtained digital image, using associative memory. The steps of the automatic object recognition method 600 may be performed by a real-time machine-learning vision system 100 (such as is depicted in FIG. 2).

Figure 2:
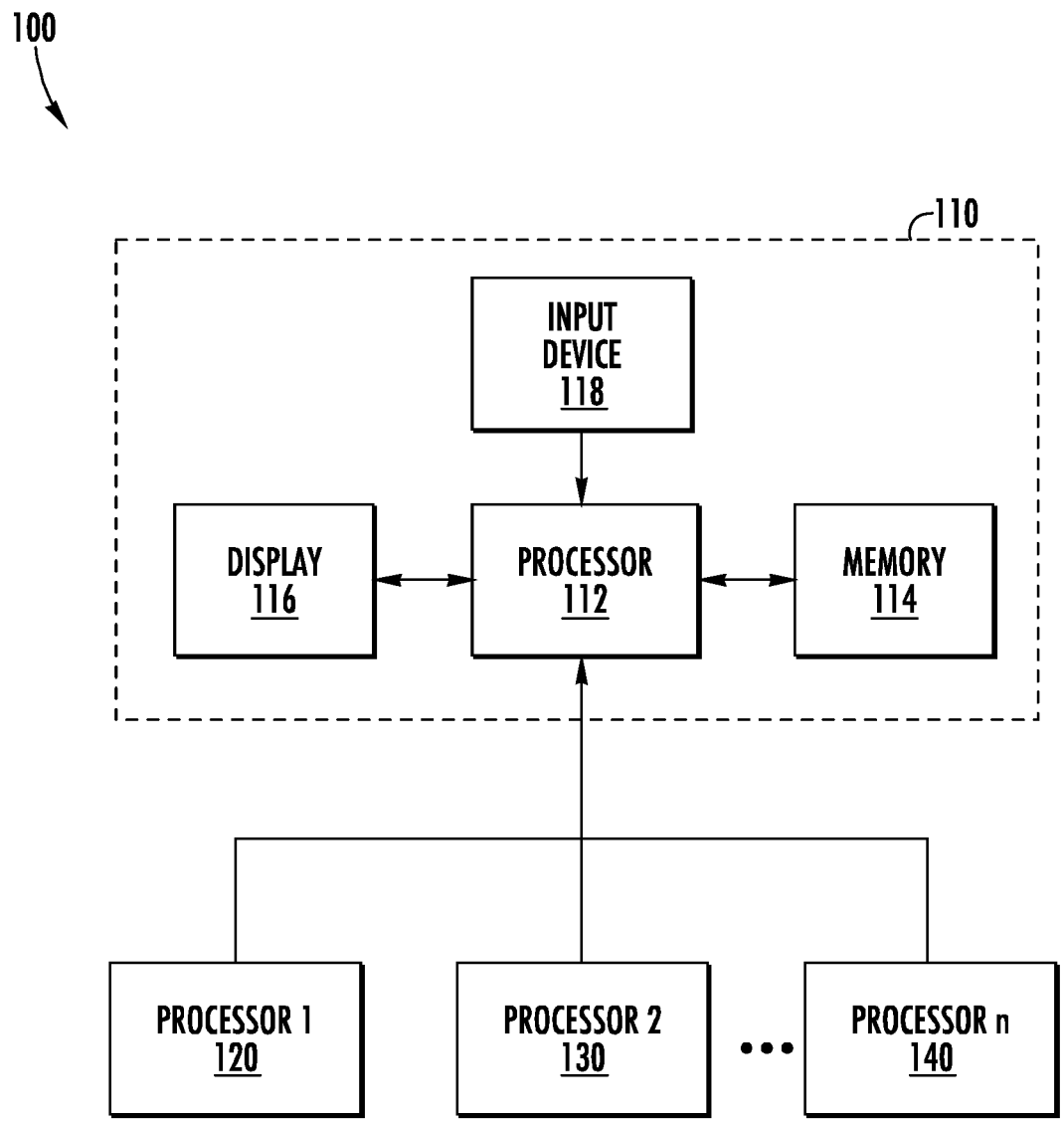
FIG. 2 is an illustration of a real-time, machine-learning vision system.

FIG. 2 is an illustration of a real-time, machine-learning vision system 100. The embodiment of the system 100 shown in FIG. 2 is a distributed processor system that has been programmed to tractably learn and recognize an unbounded number of images that are of arbitrary complexity. The system in this embodiment is sensitive enough to the order of training instances so as to mimic human learning—where general concepts are to be preferentially, but not necessarily, learned before more-specific ones for greater recognition potential. The system may recognize static and/or dynamic and/or hyperspectral and/or stereo aspects of images, fully utilizing all of the information available to it for recognition. The system may fully move camera(s)

(and/or other sensors) and utilize digital zoom to obtain an optimal image, using feedback. For example, a hierarchical image memory may enable an exponential speedup in search and retrieval time, as may the use of randomization for fusing images determined as being similar images. The system may also utilize an associative memory (AM) for enhancing its recognition rate. Various parameters may be automatically programmed. The system may be cyber-secure, self-recovering, and may be relatively immune to cyber-attack.

Different embodiments of the automatic object recognition method 600 may be referred to herein as example machine vision techniques. The automatic object recognition method 600 may learn, retain, and index all images needed for processing, by using hierarchical learning. Moreover, unlike neural networks, the automatic object recognition method 600 may recognize analogical patterns, which may assist in image recognition. For example, these patterns may include static, dynamic, hyperspectral, and/or stereoscopic components. An example system may autonomously move the camera(s) and center objects of interest using digital zoom. For example, a semantic associative memory may enable fringe recognition of partially occluded and/or rapidly moving objects. Alternative domain-specific features may be automatically programmed using constraint-based input/output (I/O). In contrast, this may not be possible using neural networks because its weights are its features, or training them would be NP-hard. For example, neural nets (e.g., deep learning) may need to adjust all of their weights every time a new memory is presented. With vector learning, photonic arrays may be used for linearly-separable learned images, and may be approximately two orders of magnitude faster than comparable digital implementations. For example, the use of linearly separable memories allows branches, at the same level, to be processed in parallel using single instruction, multiple data (SIMD) processors. While neural nets may only generalize weights, vector learning may randomize representations, thus reducing memory and search requirements in ways that may not be possible using neural networks. Training the system to perform autonomously may advantageously proceed from general to specific knowledge, which is very humanlike. In contrast, neural networks may not be not preferentially trained, which may be disadvantageous in the generality of their learning and replay.

Referring to FIG. 2, system 100 may include a computer 110 having processors 120, 130, and 140 connected thereto. Computer 110 may include a processor 112, memory 114, display 116, and input device 118, such as a keyboard or mouse. System 100 may be used to provide an increase in computing capacity by allowing processor 112 to coordinate processors 120, 130, and 140 such that maximal processing capabilities may be achieved.

The system 100 may perform an embodiment of the automatic object recognition method 600 so as to learn in polynomial time (unlike layered neural networks, which are NP-hard) and an embodiment of the system 100 may hold a virtually unbounded number of fundamental memories (again, unlike neural networks). Furthermore, the automatic object recognition method 600 may include steps that are capable of abstraction (e.g., analogical recognition) and may be capable of improving its recognition rate using semantic associative memory. The automatic object recognition method 600 may use hierarchical recognition, where the number of pixels used is sufficient to distinguish one semantic object from another. Hierarchical learning may occur through the use of one more-specific level at a time, quadrupling the number of pixels. Branches at the same level can be searched using SIMD parallel processors. For example, pixel operations may be effected using photonic processors for two-orders of magnitude speedup. The automatic object recognition method 600 may also automatically program static and dynamic video image features for improved recognition. Color and hyperspectral imagery may be possible through vector concatenation. Paired cameras producing differential vectors may supply stereo information for fusion. Acquired vectors may be subjected to randomization to generalize their representations, thus reducing memory and search requirements. The automatic object recognition method 600 may learn to focus its attention on the subject of inference through iterative camera movements and digital zoom. It may optimize and associatively store parametric information through the use of automatic programming. A capability for static attack detection may be possible by using the LISP list-processing language, since the codes are not self-modifying. For example, this may be more efficient than is the checking of mutually random I/O constraints because a single (vice multiple) periodic test may suffice. Furthermore, mutually random I/O constraints may be more efficient than algorithmic diversity due to inherent temporal run-time incompatibilities. The optimization of composed functions may be learned and iteratively effected through the repository.

As discussed further herein, an example system may be capable of abstraction in order that it can recognize structurally, if not functionally, similar images. The latter capability may be enhanced through the use of associative memory (AM). For example, images may be partially physically and/or temporally occluded, or otherwise not fully visible. These images may be subject to associative recall—including static and dynamic analysis—to compensate similarly as do humans. Processing may be amenable to the use of parallel processors for speedup. Moreover, photonics may be applicable to pixel operations for two-orders of magnitude reduction in processing time, by sacrificing up to one percent in digital accuracy through the use of spatial light modulators (SLMs). Hierarchy may be utilized to speedup stored image retrieval and recognition. Further, the image may be centered in an appropriate field of view (i.e., zoom) to facilitate recognition.

The system may utilize massively parallel processors to speed up vector processing. Both static and dynamic aspects of images may be fused for general recognition. The system may learn the most advantageous balance of the two modalities for improved recognition. Color and hyperspectral imagery may be provided, as well as paired cameras producing differential vectors for stereo vision. The system may also randomize acquired knowledge to minimize storage requirements and thus, search time.

The system may dynamically vary the focus of attention, including digital zoom, to facilitate recognition and storage. It may be remotely trained; and, it may emulate its training—including analogical patterns to improve performance (which is human-like).

The system may automatically program procedures to optimize the performance of its associative recall. While schema instances may be used, the system may or may not realize semantic diversity through the use of mutually random test vectors and associated benchmarks.

Additionally, tasks may be programmable using natural language and/or speech. This facilitates the rapid reconfiguration of task parameters for a plethora of tasks (e.g., the real-time tracking of a barrage against a complex and dynamic background for kinetic intercept).

A tractable and scalable system for machine vision may not require mathematical exactitude/perfection. That relaxation may enable photonic processors to be utilized. Additionally, unlike the case for neural networks, parallel processors are utilizable (i.e., without the presence of significant inherently serial bottlenecks). Memories are linearly separable. This is not the case for hidden-layer neural networks, and thus they are NP-hard in their learning performance. As discussed herein, pixels may be processed into vectors, which may serve to identify the image. These vectors may be hierarchically ordered, and may be only as specific as necessary to achieve visual discrimination. The use of this hierarchical tree (i.e., the hierarchically ordered vectors) may provide an exponential speedup in pattern matching. The system allows the motion of an attached device (e.g., an unmanned vehicle) to shift the focus of attention. That, in conjunction with digital zoom may provide an emulated fovea to focus on and acquire centered objects. Associative memory may then make sense out of a sequence of otherwise unrecognized semantic images.

Furthermore, unlike the case for neural networks, the automatic object recognition method 600 may provide a capability for abstraction, since each fundamental memory is independent from every other. For example, structurally similar game boards could be identified. However, the recognition of functionally similar boards may need a definition and use of game features. The recognition of structurally similar boards is more straightforward.

Images may not always be recognized within tolerance. Thus, a second, less constrained, tolerance may be provided for use in conjunction with AM, such that common sequences of image semantics may condition that which may be recognized. For example, this may be used for the recognition of partially occluded or otherwise incomplete images in space and/or time.

Each vector may be processed using SIMD parallel processing. Moreover, parallel processing, of greater dimensionality, among pixels may be realized using photonic arrays. In contrast, while neural nets may be amenable to parallel processing, they may be serially bottlenecked because each successive training may be dependent on all of the previous ones. Using example techniques discussed herein, each successive training is distinct, in order to be acquired, and the training instances are ordered from most-general to most-specific for optimal efficiency in learning. Again, this may be very human-like.

The automatic object recognition method 600 and system 100 may learn to weight and fuse static and dynamic aspects generated by image data, which is part of automatic programming. Some domains may be more amenable for static analysis (e.g., interrupt service register (ISR)), while others may be more amenable for dynamic analysis (e.g., following a moving object across a dynamic complex background).

Vectors may be extended by concatenation to provide stereo, color, and/or hyperspectral imagery, as may be needed by the domain. Paired cameras producing differential vectors may be used for stereo vision. However, monaural black and white (B&W) images may be most-quickly recognized and may be sufficient for many computer vision applications.

Acquired vectors may be fused with those defining the appropriate semantics. This spatial randomization evolves a more compact knowledge representation over time and contributes to the speed of recognition as well as the capability to properly recognize previously untrained situations.

Automatic programming may be implemented using components through the optimization of their parameters to meet requirements that may be particular to a domain. This may include the weight optimizations discussed above. This may also include the selection among semantically diverse components to optimize system performance. For example, such optimizations may be performed at chance to ensure a uniform coverage of the search space as well as to provide an allowance for an arbitrary interrupt (e.g., to rapidly change the focus of attention for a dynamic, breaking need).

The automatic object recognition method 600 may secure its components using mutually random I/O test cases/benchmarks, which may be selected at random. For example, they may be interleaved with the programmed processes. The more frequent their execution and the greater the degree of mutual randomness, the greater the degree of cybersecurity that may be attained. In this way, alternative components may be cyber-secured without writing and instantiating component schemas. Contexts can be rewound upon the detection of a cyber-attack, and a clean copy of the component(s) can be retrieved from the immutable repository and rerun. The reference benchmarks may be automatically set for each computer system that the software components are executed on. Moreover, where code is not self-modifying, and local functions having few, if any, side effects are written in a list-structured language such as LISP, cyber-attacks can be detected and recovered from in real-time using static tests for equality with the equivalent component(s) stored in an immutable repository.

Figure 3:
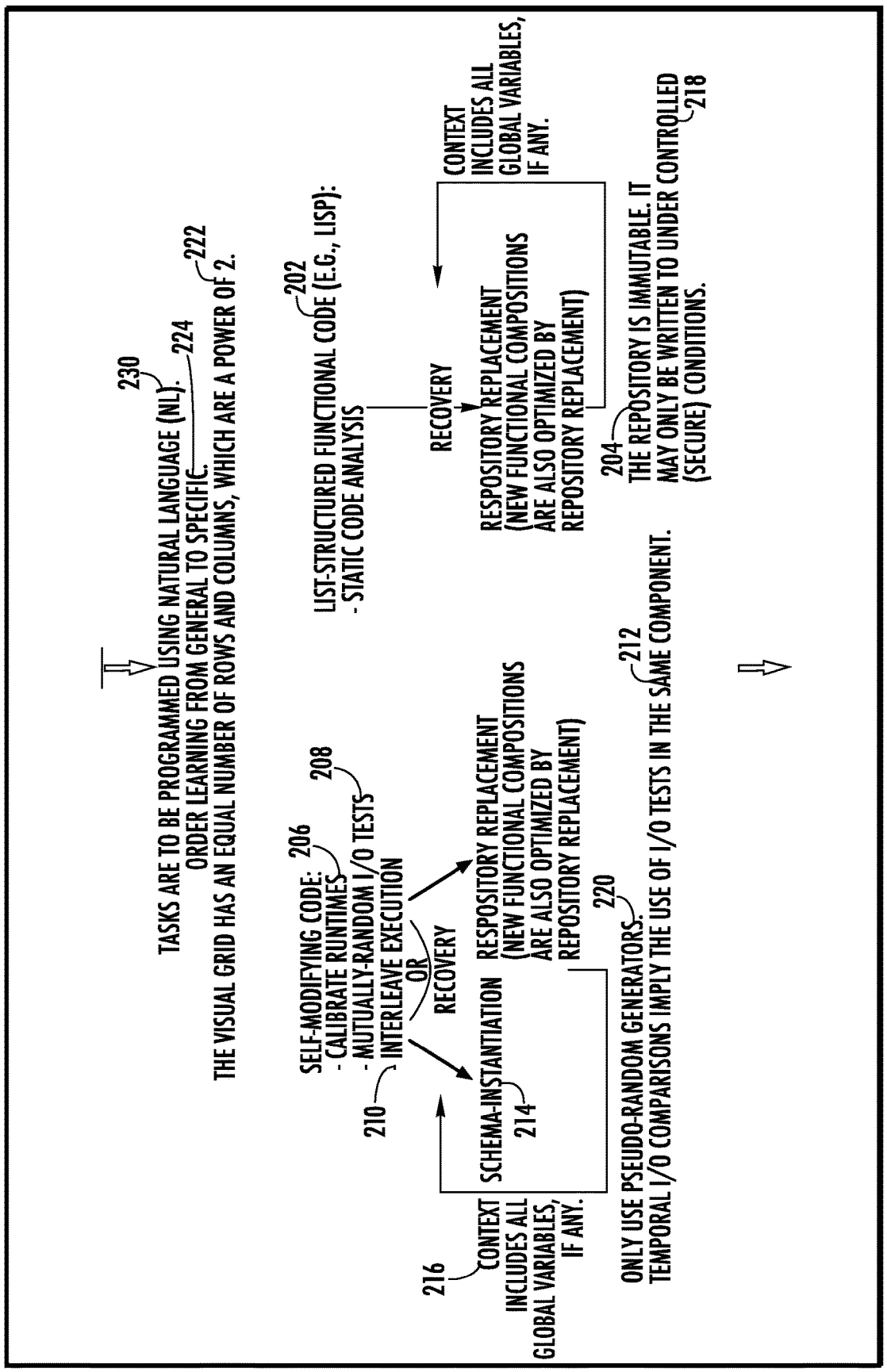
FIG. 3 illustrates an example cyber-secure learning machine vision technique.
Figure 4:
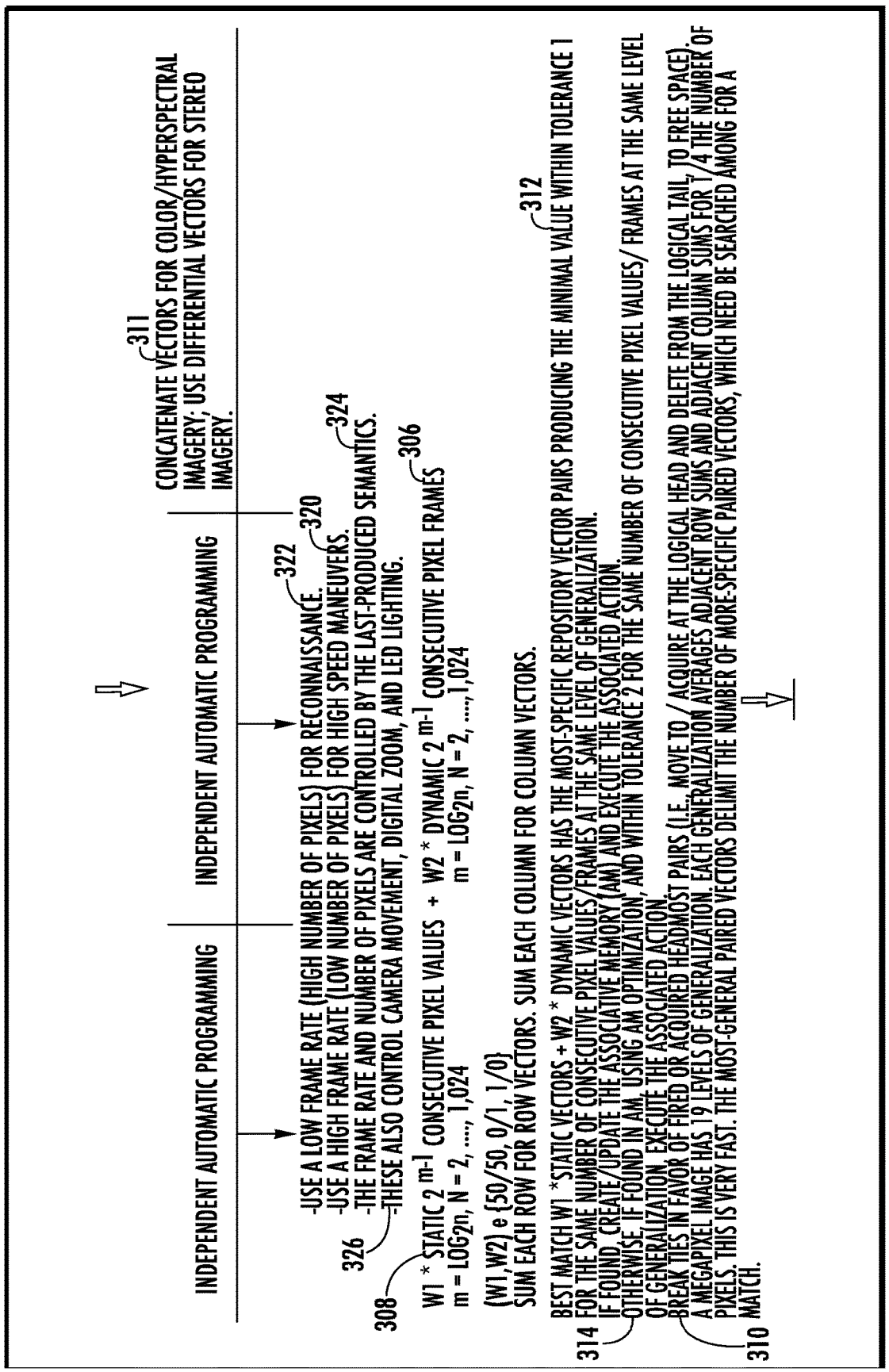
FIG. 4 illustrates an example hyperspectral learning machine vision technique.
Figure 5:
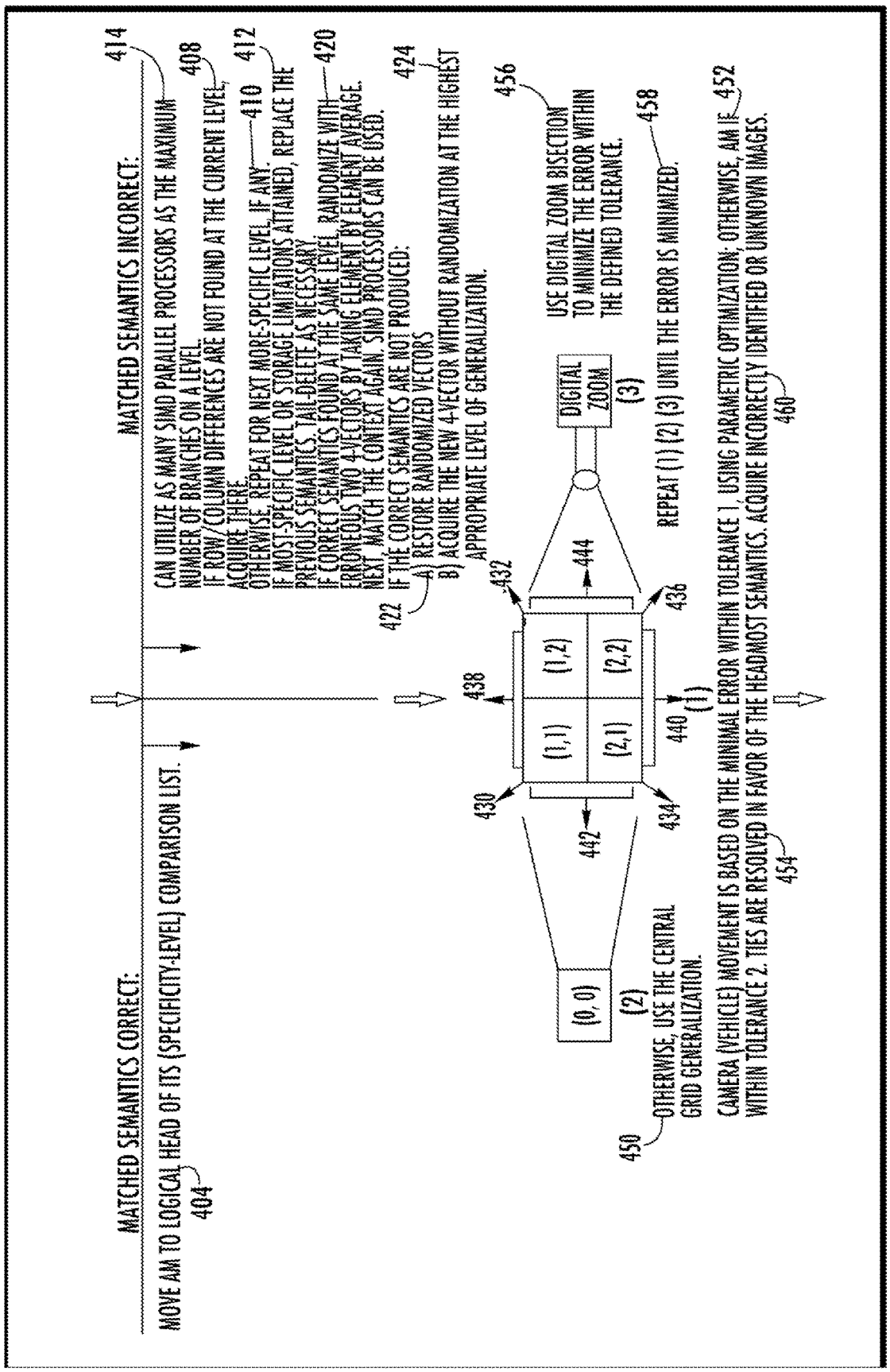
FIG. 5 illustrates an example randomizing vector learning machine vision technique.

Tasks within the automatic object recognition method 600 may be programmable using natural language. With interactive dialog, the system may configure itself in satisfaction of task parameters. Associative randomization may be utilized in an example system. FIGS. 3-5 illustrate a framework for an example associative cyber-secure vector learning machine vision embodiment of the automatic object recognition method 600.

Figure 6:
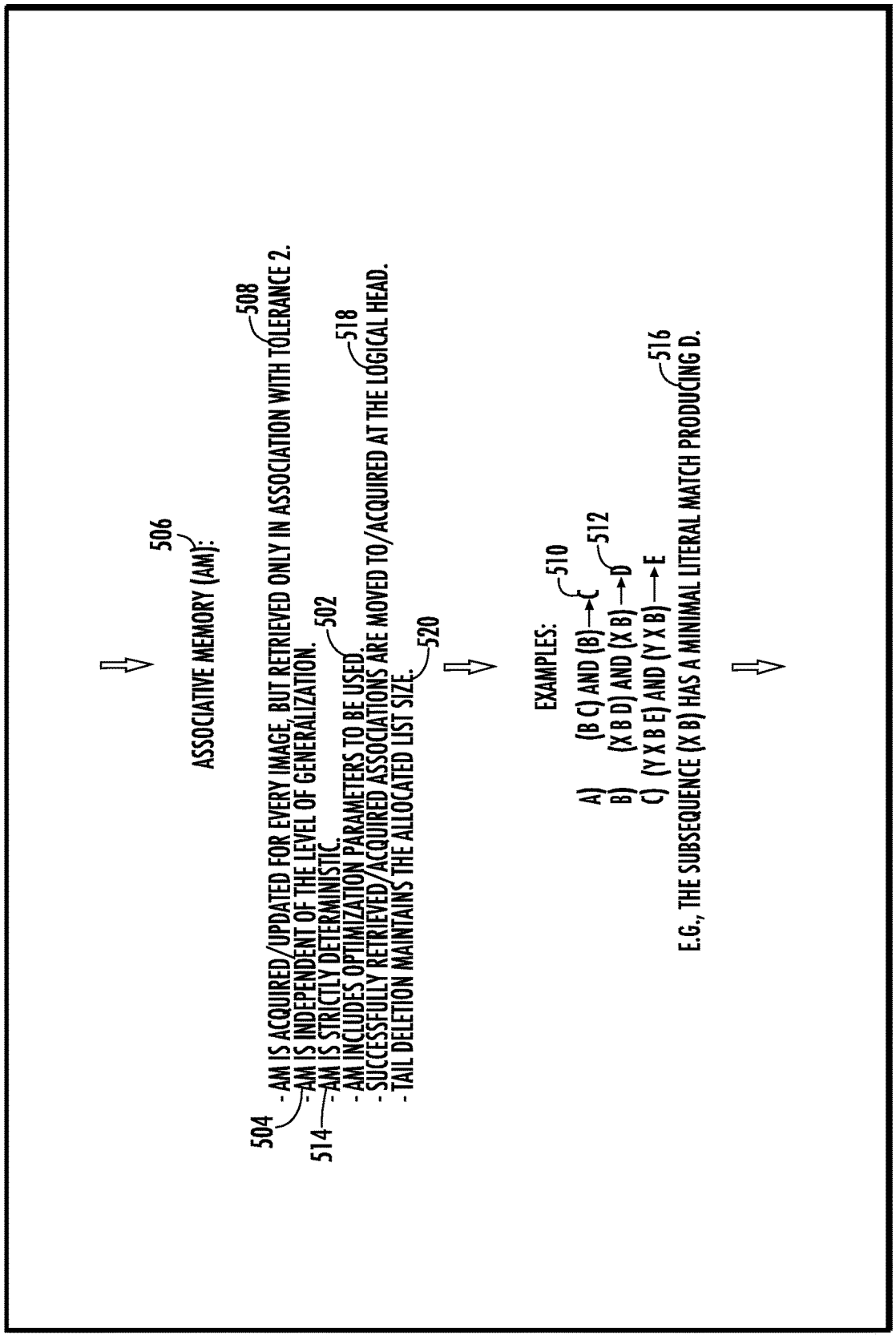
FIG. 6 illustrates an example associative learning machine vision technique.

As discussed further below, FIG. 3 illustrates an example cyber-secure learning machine vision technique, FIG. 4 illustrates an example hyperspectral learning machine vision technique, FIG. 5 illustrates an example randomizing vector learning machine vision technique, and FIG. 6 illustrates an example associative learning machine vision technique.

In accordance with example techniques discussed herein, components may be characterized by their I/O behaviors and associated runtimes. In order to detect potential corruption, a static code analysis (202) that includes testing for equality with the equivalent component stored in an immutable repository (204), may be run, if the code is not self-modifying and is written in a list-structured language such as LISP. Otherwise, runtimes may be calibrated upon first executions (206). Each component may be associated with one or more mutually random benchmarks for their characterization, chosen at random (208). Deviations may result from malicious code, including cycle stealing. Dynamic benchmarks, or static code analyses, may be evaluated by interleaving their execution with the programmed processes (210). The frequency and diversity of their execution is proportionate to the degree of cybersecurity that may be attained. Alternative semantic components may provide algorithmic diversity; however, this may preclude direct I/O comparisons (e.g., temporal), in general (212). Rather, distinct (mutually random) I/O pairs (including repeatable pseudo-random sequences) may provide test vectors for different execution paths, effectively providing advantages associated with algorithmic diversity for the detection of and recovery from cyber-attacks. Recovery may include schema-based instantiation (214) of semantically equivalent program(s) to be rerun. Otherwise, an uninfected copy of the component may be retrieved from the repository and rerun. For example, the context includes the values of all global variables upon component entry (216). That, in addition to the facilitation of parallel processing, may provide another reason to use local (composable) functions for ensuring cybersecurity. In some embodiments, the repository may only be written to under controlled (secure) conditions (218).

A random preprocessor construct (220), which randomly searches among specified alternative components to optimize some objective function (e.g., I/O constraints), may provide automatic programming for the machine vision (directed mining) problem. One component computes the number of complements in pixel values, another the number of complements from two or more consecutive pixel values, another the number of complements from three or more consecutive pixel values . . . the number of complements from $2**m-1$ consecutive pixel values—say for the m=$\log_2$ n choices for n=2, . . . . Consecutive pixel values may imply pixels in consecutive frames (e.g., from one frame to one second of frames) in the case of dynamic pixel differentials (306), as discussed below. These values are doubled for each successive generalization, to ensure compatibility across levels, were it not for averaging. Static (308) and dynamic pixel differentials are independently optimized for each problem space. The associative memory records the optimum number of consecutive pixel values/frames for static and dynamic pixel differentials, respectively, and may be segmented on the basis of these values.

As an example, a MOBIUS camera 720P, or equivalent, may stream video to a processor(s) to run an example technique in the newLISP language. For example, LISP, like PYTHON, facilitates the processing of tree data structures using lists and static code analysis. A grid may be defined as an equal number of rows and columns, which are a power of 2 (222). The number of complements in pixel values, or similar metric, may be summed for each row and for each column. This may include a pair of summation vectors for the most-specific grid (i.e., the one output by the digital video camera). Each pair of vectors at each level is separately optimized for static and dynamic pixel differentials, thus enabling the associative context to direct what to expect.

Each successively more-general grid replaces adjacent entries in the summation vectors with their average value, thereby reducing the magnitude of the row and column vectors by half. This may imply that each successively more-general grid may need twice the change in pixel values of its predecessor to be counted as a complement, defined by a unitary change. In this way, 1,048,576 pixels may be reduced to four, in nineteen levels, as its most-general representation.

The averaging process has a side effect equivalent to shifting the pixels to minimize the differences between the more or less aligned (centered) vectors. Unstabilized saccadic (e.g., quick, jerky) movement of the camera (or other image sensing device) may aid in this regard as well, particularly for the more-specific grids (i.e., because they are more sensitive to movement). The contextual input may then be determined to match the pair of row and column vectors having minimum $|R-R_i|+|C-C_i|$ within tolerance (e.g., within a tolerance threshold value) for a static pixel differential, where R is a row contextual input, C is a column contextual input, and i indexes the pair of repository comparison vectors being matched at the same level (e.g., common level) of granularity. Ties may be broken (310) in favor of the most-recent acquisition or correctly-fired vector pair (i.e., the logically headmost entry), which has four components, or more, if the dynamic vectors are included, as discussed further below. The matching process may be performed from the most-general paired vectors to the most-specific paired vectors (224).

Different (i.e., non-rectangular) orientations of the subject of interest may need a few trainings; albeit, substantially less than the intractable number needed for hidden-layer neural networks. For example, the requisite number of trainings may be considered as more humanlike. It may be possible to concatenate vector results for filters/radar/sonar/et al. for color/hyperspectral imagery (311).

Vector matches may be determined as discussed below. At each level of specificity, the row-column pairing having the minimal difference (312) from the contextual-input (e.g., breaking ties as discussed above) may be recorded. Upon reaching the last such pairing, the matched semantics having minimal error may be checked for validity. A prediction may be issued if the associated semantics are within tolerance (e.g., within a predetermined tolerance threshold) after random selection and error-minimization among the optimization parameters for a predetermined allowed time period (temporal interval). Otherwise, the associative memory may be checked (314) and a prediction may be issued if the associated semantics are within a second less-exacting tolerance (e.g., within a predetermined second tolerance threshold), using the associatively recorded optimization parameter. If it is correct, all that is learned comes from moving it and the associated memory to the logical head of its (specificity-level) comparison list (404).

However, if the matched semantics is incorrect, steps discussed below are utilized. If the specific row-column differences are not found at the current level, the row-column pairing is acquired (408) at this level (i.e., the current level) and associated with the correct semantics. For this step, the tolerance value for elemental equality is less than unity, thereby allowing for twice the variance in pixel values of its next more-specific level. For example, given this tolerance, there may be at most one match for any set of vectors at any level. Otherwise, the row-column pairing may be tested for acquisition at the next more-specific level (410). If there is no more-specific level, the correct semantics replaces the incorrect ones (412). Similarly, the new semantics replaces the old one whenever the storage limitations for a level are reached. This may improve recognition, because failed pairs fall to the bottom, where they are first to be replaced (i.e., tail deletion). Branches at the same level may be matched using massively parallel SIMD processors (414). Thus, an indefinite number of fundamental memories may be processed in hard real-time. The learning of specific levels as exceptions to general levels may imply that the training instances will be most efficient if ordered from general recognition (e.g., automobile, house, person) to more-specific recognition (speedster, ranch, adult) and so on. Machine learning is accomplished by acquisition of the most-general rule, which is not found to be in contradiction, but if such a contradiction is found, the learned rule is made minimally more specific to prevent said contradiction. Conversely, when pattern-matching to pick the best rule to fire (i.e., the so-called agenda mechanism), it finds the most-specific (non-deterministic) rule covered by the context. This is an example of how the iterative learning and agenda mechanism work.

The example technique for the acquisition of more-specific vectors (i.e., on the right) discussed above may allow for the optional use of a variable number of initial pixels. An optional variable frame rate may be supported by a corresponding variable number of pixels. As an example, a high frame rate (low number of pixels) may support machine vision for rapid sense and control (e.g., high-speed maneuvers) (320), while a low frame rate (high number of pixels) may support machine vision for reconnaissance (e.g., analytical decision support) (322). The frame rate and number of pixels may be controlled by the last-produced semantics (324). All semantic optimizations are part of the learning process for the associative memory. Semantics may also be used to control camera movement, digital zoom, and (infrared) light-emitting diode (LED) lighting for relatively close operations (e.g., reconnaissance) after dark (326).

A sequence of images may be created and used as discussed above. For example, a moving device (e.g., a vehicle) may then be recognized, which is relatively stable in comparison with the moving more-distant background, which appears as noise. The following steps may be utilized to recognize objects based on their relative motion. Complements in pixel values may be counted in successive frames and summed for each row and column. The number of complements from various minimal numbers of consecutive pixel frames may be optimized, similarly as discussed above. Aligned videos of motionless objects may tend to yield corresponding elements having differences of less than unity at every level. The associated semantics are ascribed as discussed above. SIMD parallel processors may be utilized for high frame rates and high resolutions.

Again, dynamic images may be recognized from their relative motions (e.g., somewhat similar to the visual systems of many species of dinosaur, such as the Tyrannosaurus Rex). Dynamic image recognition may be fused with static image recognition by finding for the minimum of $|R-R_i|+|C-C_i|+|R-R_j|+|C-C_j|$, where R and C are as before, i indexes the static differential for the pair of repository comparison vectors, and j indexes the dynamic differential for the pair of repository comparison vectors, for the same number of consecutive pixel values/frames being matched at the same level of generalization within tolerance. Static and dynamic components may also be weighted based on their relative value in the type of visual recognition (e.g., highly weighting static images for landscape recognition, and/or highly weighting dynamic images for detection of moving objects). These three weights (i.e., 50/50—by default, 0/1, or 1/0) may be randomly evaluated at runtime as part of the optimization process. They, along with the static and dynamic pixel differentials, may be optimized and saved for use with the associative recognition algorithm, thereby enabling the system to better sense that, which it expects to see.

Whenever a vector match (312), having minimum w1 $(|R-R_i|+|C-C_i|)$ w2 $(|R-R_j|+|C-C_j|)$, produces an incorrect semantics, the minimum vector match (resolving ties in favor of the headmost one (310)), producing the correct semantics, at the same level it is found (if at all), may be randomized (420) with the contextual input of corresponding dimensionality by replacing the two 4-vectors with one, which is determined as the average of the two 4-vectors, element by element. This may save on unnecessary storage and hence on search time. If matching the context against the previously incorrectly selected vector and this replacement vector, does not now produce the correct semantics (with the tolerance for elemental equality being less than unity), the randomized vectors may be restored (422) to their original values and the new 4-vector is obtained without randomization (424) at the highest appropriate level of generalization. For example, SIMD parallel processors (414) may be used for more efficient processing.

The central grid may be compared with each of four corner grids taken from the next level of specificity (i.e., so each block includes the same number of pixels as the more-general block). A goal of this is to emulate the fovea, or focus of attention. In this step, the error in row and column summation vectors may be compared for each block using the (associative) best match from the repository for each. If block [1, 1] is minimal and within Tolerance 1, the upper left (430) receives focus; if block [1, 2] is minimal and within Tolerance 1, the upper right (432) receives focus; if block [2, 1] is minimal and within Tolerance 1, the lower left (434) receives focus; and, if block [2, 2] is minimal and within Tolerance 1, the lower right (436) receives focus. However, if blocks [1, 1] and [1, 2] are minimal and within Tolerance 1, the focus is up (438); if blocks [2, 1] and [2, 2] are minimal and within Tolerance 1, the focus is down (440); if blocks [1, 1] and [2, 1] are minimal and within Tolerance 1, the focus is left (442); and, if blocks [1, 2] and [2, 2] are minimal and within Tolerance 1, the focus is right (444). Otherwise, the central grid generalization (450) is selected for processing if it is minimal and within Tolerance 1. Parameters are randomly optimized as before (502). If not within Tolerance 1, this step may be repeated using the less-exacting, Tolerance 2 and associative memory (452), as discussed below. Ties are resolved in favor of the headmost semantics (454). Next, the zoom may be moved in/out, using a logarithmic bisection algorithm (456), and the block-selection process repeats until the selected quadrant/central grid and zoom minimize the error within the defined tolerance (458). This process may result in a known appropriately centered image, if any. Incorrectly identified or unknown images are properly acquired as before (460).

Semantics are independent of the level at which they may be found (504). A semantic sequence may serve as an associative memory (506). Each minimal semantic sequence is stored (and updated within a maximum allowed sequential length) (508) and used as a predictor of the last element. For example, the sequence (B C) and (B) is minimal for predicting C and is a randomization (510) of (A B C) and (D B C), which would not be created in the presence of (B C). However, (B C) may need (X B D) and (X B) to minimally differentiate it for the prediction of D (512). Non-determinism may not be permitted (514). Further grammatical randomization may be inefficient. The longest literally-matched subsequence may provide the associative completion. If not matched, or incorrectly matched, the minimally longest deterministic subsequence is obtained (516) along with the correct associative completion. Overwrites, for updates, may be performed as needed. If no image is found to be within Tolerance 1, it may be associatively recognized using a less-exacting Tolerance 2, including the found associatively-specified optimization parameters. If no image is found to be within Tolerance 2, using the associated optimization parameters, the image may be declared unknown. The associations may be maintained in a list of lists, where successfully applied associations are moved to the logical head (518). New, minimally longer associations may also be acquired at the logical head. Tail deletion (520) may be applied whenever the list exceeds the allocated size. These anticipatory semantics (e.g., for partially-occluded images and/or inertial-based movement) may be used to preferentially favor the production of actions, where literal recognition is a near miss.

As an example use case, techniques discussed herein may run on a quadcopter, which may be quickly trained on a moving human face, the human moved to another room, and the quadcopter may engage in a search from room to room for the individual in motion (e.g., somewhat similar to a bloodhound). For example, techniques discussed herein may be used for the autonomous control of moving devices based on visual navigation. It may also be applied to the hard real-time tracking of a barrage against a complex and dynamic background.

Natural language (e.g., speech) (NL) may be used to program control of devices (230), including abstractions or searches for similarity. It may similarly be used for the retrieval (and/or for the modification) of functional components from the capability-accessed (r/w/+) immutable repository. Component compositions may be optimized by substitution using the repository.

In one embodiment, the automatic object recognition method 600 could be run on the NVIDIA TX1 containing 256 cores running at an aggregate speed of one petaflop. For example, the newLISP codes may be converted to C using threading and parallel *arrays. It may be noted that the SIMD parallelism is not limited to 256 cores. For example, millions of processors may be run in parallel for the real-time processing of billions of images within just one hierarchical segment. There could be thousands of segments. It is clear that such a system can significantly outperform the human visual system (Area 17 of the neural cortex)—including the use of hyperspectral imagery. If one includes the use of photonic pixel processors (simulated on a von-Neuman architecture), it may be more likely than not that machine vision, enabled by the discussion herein, can surpass anything of biological origin. Moreover, orders of magnitude more capable associative processing than are humanly possible may amplify that gain even further and in a cyber-secure environment. Given capabilities for abstraction, analogy, automatic programming, data fusion, randomization, and what may be termed intelligent learning and recognition (i.e., ordering the training instances from general to specific), it is conceivable that speech (Broca's area), natural language processing (Wernicke's area), reasoning (frontal lobes), and other brain centers might be developed for the context of robotics.

Example aspects discussed herein may be implemented as a series of modules, either functioning alone or in concert with physical electronic and computer hardware devices. Example techniques discussed herein may be implemented as a program product comprising a plurality of such modules, which may be displayed for a user. As used herein, the term "module" generally refers to a software module. A module may be implemented as a collection of routines and data structures that performs particular tasks or implements a particular abstract data type. Modules generally are composed of two parts. First, a software module may list the constants, data types, variables, and routines that may be accessed by other modules or routines. Second, a module may be configured as an implementation, which may be private (i.e., accessible only to the module), and which contains the source code that actually implements the routines or subroutines upon which the module is based. Such modules may be utilized separately and/or together locally and/or remotely to form a program product thereof, that may be implemented through non-transitory machine readable recordable media.

Various storage media, such as magnetic computer disks, optical disks, and electronic memories, as well as non-transitory computer-readable storage media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

Features discussed herein are provided as example techniques that may be implemented in many different ways that may be understood by one of skill in the art of computing, without departing from the discussion herein. Such features are to be construed only as example features, and are not intended to be construed as limiting to only those detailed descriptions.

For example, instances may be trained, based on ordering from most-general stored images to most-specific stored images, in training.

For example, automatically recognizing the object by generating the first vector representation of the plurality of pixels of the obtained digital image includes generating a most-specific vector representation of the plurality of pixels of the digital image.

For example, obtaining the digital image includes determining a focus area of a target object for obtaining the digital image.

For example, a camera is trained to focus attention on a subject of inference based on iterative camera movements and digital zoom.

For example, randomizing the first vector representation to generate the first generalized vector representation of the digital image that is substantially an order of magnitude smaller than the first vector representation includes generating the first generalized vector representation of the digital image that has a size that is substantially a power of two smaller than a size of the first vector representation.

For example, the first generalized vector representation of the digital image may be iteratively randomized to generate a plurality of successively more-generalized vector representations that are successively substantially an order of magnitude smaller than sequentially preceding generalized vector representations, for each of the successively more-generalized vector representations.

One skilled in the art of computing will appreciate that many other types of techniques may be used for implementing techniques discussed herein, without departing from the discussion herein.

Features discussed herein are provided as example techniques that may be implemented in many different ways that may be understood by one of skill in the art of computing, without departing from the discussion herein. Such features are to be construed only as example features, and are not intended to be construed as limiting to only those detailed descriptions.

For example, the one or more processors (e.g., hardware device processors) may be included in at least one processing apparatus. One skilled in the art of computing will understand that there are many configurations of processors and processing apparatuses that may be configured in accordance with the discussion herein, without departing from such discussion.

In this context, a "component" or "module" may refer to instructions or hardware that may be configured to perform certain operations. Such instructions may be included within component groups of instructions, or may be distributed over more than one group. For example, some instructions associated with operations of a first component may be included in a group of instructions associated with operations of a second component (or more components). For example, a "component" herein may refer to a type of functionality that may be implemented by instructions, which may be located in a single entity, or may be spread or distributed over multiple entities, and may overlap with instructions and/or hardware associated with other components.

In this context, a "memory" may include a single memory device or multiple memory devices configured to store data and/or instructions. Further, the memory may span multiple distributed storage devices. Further, the memory may be distributed among a plurality of processors.

One skilled in the art of computing will understand that there may be many ways of accomplishing the features discussed herein.

It will be understood that many additional changes in the details, materials, steps and arrangement of parts, which have been herein described and illustrated to explain the nature of the invention, may be made by those skilled in the art within the principle and scope of the invention as expressed in the appended claims.

I claim:

1. A method comprising:
automatically recognizing an object in a digital image by:
obtaining the digital image;
generating a first vector representation of a plurality of pixels of the obtained digital image;
randomizing the first vector representation to generate a first generalized vector representation of the digital image that is substantially an order of magnitude smaller than the first vector representation; and
searching a repository of hierarchically generalized vector representations of previously recognized digital images, to determine whether the first generalized vector representation of the digital image matches one or more of the previously recognized digital images, within a predetermined threshold value, based on determining a focus area within the obtained digital image, using associative memory.

2. The method of claim 1, further comprising training instances ordered from most-general stored images to most-specific stored images, in training.

3. The method of claim 1, wherein automatically recognizing the object by generating the first vector representation of the plurality of pixels of the obtained digital image includes generating a most-specific vector representation of the plurality of pixels of the digital image.

4. The method of claim 1, wherein obtaining the digital image includes determining a focus area of a target object for obtaining the digital image.

5. The method of claim 1, wherein a camera is trained to focus attention on a subject of inference based on iterative camera movements and digital zoom.

6. The method of claim 1, wherein randomizing the first vector representation to generate the first generalized vector representation of the digital image that is substantially an order of magnitude smaller than the first vector representation includes generating the first generalized vector representation of the digital image that has a size that is substantially a power of two smaller than a size of the first vector representation.

7. The method of claim 1, further comprising iteratively randomizing the first generalized vector representation of the digital image to generate a plurality of successively more-generalized vector representations that are successively substantially an order of magnitude smaller than sequentially preceding generalized vector representations, for each of the successively more-generalized vector representations.

8. A system comprising: at least one hardware device processor; and a non-transitory computer-readable storage medium storing instructions that are executable by the at least one hardware device processor to automatically recognize an object in a digital image by: obtaining the digital image; generating a first vector representation of a plurality of pixels of the obtained digital image; randomizing the first vector representation to generate a first generalized vector representation of the digital image that is substantially an order of magnitude smaller than the first vector representation; and searching a repository of hierarchically generalized vector representations of previously recognized digital images, to determine whether the first generalized vector representation of the digital image matches one or more of the previously recognized digital images, within a predetermined threshold value, based on determining a focus area within the obtained digital image, using associative memory.

9. The system of claim 8, wherein the instructions are executable by the at least one hardware device processor to train instances ordered from most-general stored images to most-specific stored images.

10. The system of claim 8, wherein generating the first vector representation of the plurality of pixels of the obtained digital image includes generating a most-specific vector representation of the plurality of pixels of the digital image.

11. The system of claim 8, wherein obtaining the digital image includes determining a focus area of a target object for obtaining the digital image.

12. The system of claim 8, wherein a camera is trained to focus attention on a subject of inference based on iterative camera movements and digital zoom.

13. The system of claim 8, wherein randomizing the first vector representation to generate the first generalized vector representation of the digital image that is substantially an order of magnitude smaller than the first vector representation includes generating the first generalized vector representation of the digital image that has a size that is substantially a power of two smaller than a size of the first vector representation.

14. The system of claim 8, wherein the instructions are executable by the at least one hardware device processor to iteratively randomize the first generalized vector representation of the digital image to generate a plurality of successively more-generalized vector representations that are successively substantially an order of magnitude smaller than sequentially preceding generalized vector representations, for each of the successively more-generalized vector representations.

15. A non-transitory computer-readable storage medium storing instructions that are executable by at least one hardware device processor to automatically recognize an object in a digital image by:

obtaining the digital image;

generating a first vector representation of a plurality of pixels of the obtained digital image;

randomizing the first vector representation to generate a first generalized vector representation of the digital image that is substantially an order of magnitude smaller than the first vector representation; and searching a repository of hierarchically generalized vector representations of previously recognized digital images, to determine whether the first generalized vector representation of the digital image matches one or more of the previously recognized digital images, within a predetermined threshold value, based on determining a focus area within the obtained digital image, using associative memory.

16. The non-transitory computer-readable storage medium of claim 14, wherein the instructions are executable by the at least one hardware device processor to train instances ordered from most-general stored images to most-specific stored images.

17. The non-transitory computer-readable storage medium of claim 14, wherein generating the first vector representation of the plurality of pixels of the obtained digital image includes generating a most-specific vector representation of the plurality of pixels of the digital image.

18. The non-transitory computer-readable storage medium of claim 14, wherein randomizing the first vector representation to generate the first generalized vector representation of the digital image that is substantially an order of magnitude smaller than the first vector representation includes generating the first generalized vector representation of the digital image that has a size that is substantially a power of two smaller than a size of the first vector representation.

19. The non-transitory computer-readable storage medium of claim 14, wherein a camera is trained to focus attention on a subject of inference based on iterative camera movements and digital zoom.

20. The non-transitory computer-readable storage medium of claim 14, wherein the instructions are executable by the at least one hardware device processor to iteratively randomize the first vector representation of the digital image to generate a plurality of successively more-generalized vector representations that are successively substantially an order of magnitude smaller than sequentially preceding generalized vector representations, for each of the successively more-generalized vector representations.

* * * * *